(12) United States Patent
Johnson et al.

(10) Patent No.: US 7,581,450 B2
(45) Date of Patent: Sep. 1, 2009

(54) RELAXATION MODULUS SENSOR, STRUCTURE INCORPORATING SAME, AND METHOD FOR USE OF SAME

(75) Inventors: Mont A. Johnson, Perry, UT (US); John L. Shipley, Tremonton, UT (US); Robert Graham, Perry, UT (US); Lee H. Pearson, Bear River City, UT (US)

(73) Assignee: Alliant Techsystems Inc., Minneapolis, MN (US)

( * ) Notice: Subject to any disclaimer, the term of this patent is extended or adjusted under 35 U.S.C. 154(b) by 177 days.

(21) Appl. No.: 11/555,029

(22) Filed: Oct. 31, 2006

(65) Prior Publication Data

US 2008/0110274 A1    May 15, 2008

(51) Int. Cl.
 *G01L 1/00* (2006.01)
 *G01N 3/00* (2006.01)
(52) U.S. Cl. ................................. 73/768; 73/803
(58) Field of Classification Search ............... 73/768, 73/775, 803, 802
 See application file for complete search history.

(56) References Cited

U.S. PATENT DOCUMENTS

| | | | |
|---|---|---|---|
| 3,693,421 A | | 9/1972 | Karper et al. |
| 3,937,070 A | * | 2/1976 | Briar .......................... 73/767 |
| 4,393,319 A | * | 7/1983 | Bock ........................... 310/80 |
| 4,895,027 A | * | 1/1990 | Manahan, Sr. ................ 73/799 |
| 4,922,096 A | * | 5/1990 | Brennan ..................... 244/3.16 |
| 5,103,679 A | | 4/1992 | Porter et al. |
| 5,394,753 A | | 3/1995 | Moriyoshi |
| 5,438,863 A | | 8/1995 | Johnson |
| 5,440,300 A | * | 8/1995 | Spillman, Jr. ............ 340/10.34 |
| 5,970,393 A | * | 10/1999 | Khorrami et al. ........... 455/129 |
| 6,431,007 B1 | * | 8/2002 | Roy ............................ 73/800 |
| 6,539,809 B1 | | 4/2003 | Weiss et al. |
| 6,584,856 B1 | * | 7/2003 | Biter et al. .................... 73/768 |
| 6,622,558 B2 | * | 9/2003 | Huff et al. .................. 73/432.1 |

OTHER PUBLICATIONS

Y. Zou, L. Tong, G. P. Steven, "Vibration-based model-dependent damage (delamination) identification and health monitoring for composite structures—a review." Journal of Sound and Vibration (2000) 230(2), 357-378.*
"deform." Collins English Dictionary. London: Collins, 2000. Credo Reference. Dec. 9, 2008.*
K. Rajanna and M. M. Nayak. "Strain Sensors." Wiley Encyclopedia of Electrical and Electronics Engineering. J. Webster ed. 1999.*

* cited by examiner

*Primary Examiner*—Lisa M Caputo
*Assistant Examiner*—Punam Patel
(74) *Attorney, Agent, or Firm*—TraskBritt (57) ABSTRACT

A sensor for measuring material properties such as the relaxation modulus of a material in situ and a method of measuring material properties of a material are disclosed. The sensor may be substantially embedded in the material, and includes a deformable driver. When actuated, the deformable driver may create a stress in the adjacent material. The movement or deformation of the driver may be measured with a sensing device, for example a strain gage mounted on a surface thereof. The stress in the adjacent material may be measured with a second sensing device, for example a pressure sensor. The measured movement and stress over a predetermined period of time may he used to determine the relaxation modulus of the material.

27 Claims, 6 Drawing Sheets

RELAXATION MODULUS SENSOR, STRUCTURE INCORPORATING SAME, AND METHOD FOR USE OF SAME

STATEMENT REGARDING FEDERALLY SPONSORED RESEARCH OR DEVELOPMENT

This invention was made with Government support under Contract No. F04611-03-C-0024 awarded by the Air Force Research Lab. The Government has certain rights in this invention.

BACKGROUND OF THE INVENTION

1. Field of Invention

The present invention, in various embodiments, relates to an in situ relaxation modulus sensor for viscoelastic materials, structures incorporating such sensors and a method for use of such a sensor.

2. Discussion of Related Art

The relaxation modulus of a viscoelastic material is a coefficient describing the material's property of releasing or "relaxing" over time when under constant deformation at a constant temperature. Relaxation modulus is a time-dependent material property. The force required to hold a viscoelastic material in constant deformation, while at a constant temperature, diminishes over time. The relaxation modulus of a material is indicative of the mechanical stiffness of the material.

The stress relaxation of an elastomeric material may be measured using conventional test equipment such as the testing apparatus disclosed in U.S. Pat. No. 3,693,421 to Karper et al. A sample of the material is located within a recess of a stator die member, and a piston is used to maintain a predetermined regulated pressure of a conical die member on the sample. The conical die member is rotated a small preselected degree, which in turn exerts a predetermined torque on the sample. A load cell on the mechanism driving the conical die member measures the relaxation which occurs within the specimen.

Another conventional method of measuring the relaxation modulus of a test piece is using the testing device of U.S. Pat. No. 5,394,753 to Moriyoshi. A test piece is attached between two relatively displaceable members and is compressed and curved when a drive means moves the members relative to one another. A load cell is positioned between the drive means and the displaceable members. The load cell may be used to determine the load applied to the test piece.

These conventional methods of measuring stress relaxation and relaxation modulus require a sample of the desired material to be taken from the application (e.g., the structure incorporating the material) or from stock material. The sample is then deformed for testing. Removing the sample of the material from the application requires either disassembly and repair of the application, or the application must be sacrificed in order to conduct the testing. For example, in order to conventionally test rocket motors for the effects of chemical aging on both the propellant and the rocket motor liner, it is necessary to dissect motors, cut samples of the propellant and liner, and perform destructive laboratory tests to monitor the changes. The measured motors are destroyed and it is necessary to assume that they are representative of the remaining motors in the fleet. However, chemical aging trends may be masked by differences between motors, such as the chemical composition of the propellant, variations in the liner composition, or by environmental factors such as storage location, storage temperature, temperature change, humidity or exposure to contaminants. A faulty assumption regarding the condition of an untested rocket motor could potentially lead to catastrophic failure and possible loss of life. It would be advantageous to monitor and test the mechanical properties of the propellant and liner non-destructively in the individual rocket motors. It would be desirable to determine the aging trends for each individual motor, rather than extrapolating trends from a single test motor.

Therefore it would be advantageous to provide a device and method for non-destructive testing of viscoelastic materials. Non-destructive testing of the material properties of an item, for example the relaxation modulus, may ameliorate one cost of the testing (the destruction of the item) and provide accurate test results.

SUMMARY OF THE INVENTION

One embodiment of the present invention comprises a sensor for measuring relaxation modulus in a test material, comprising: a frame having an opening therethrough; a driver mounted within the opening of the frame; a first sensing device in communication with the driver; and a second sensing device disposed within a gap between the driver and the frame.

An embodiment of a method for measuring relaxation modulus in a test material comprises: providing a sensor comprising at least one deformable driver; embedding the sensor in the test material; actuating the at least one deformable driver with a stimulus to create a stress in the test material; and sensing the stress in the test material.

Another embodiment of a sensor for measuring relaxation modulus in a test material comprises: a driver comprising deformable material embedded in the test material; a first sensing device in communication with the deformable material; and a second sensing device positioned adjacent the deformable material and in communication with the test material.

Another embodiment is a rocket motor, comprising: a propellant; a liner at least partially surrounding the propellant; and a sensor substantially embedded in the liner, the sensor comprising: a frame having an opening therethrough; a driver mounted within the opening of the frame; a first sensing device in communication with the driver; and a second sensing device disposed within a gap formed between the driver and the frame.

BRIEF DESCRIPTION OF THE SEVERAL VIEWS OF THE DRAWINGS

While the specification concludes with claims particularly pointing out and distinctly claiming that which is regarded as the present invention, the advantages of the invention may be more readily ascertained from the following description of the invention when read in conjunction with accompanying drawings in which:

DETAILED DESCRIPTION OF THE INVENTION

Figure 1A:
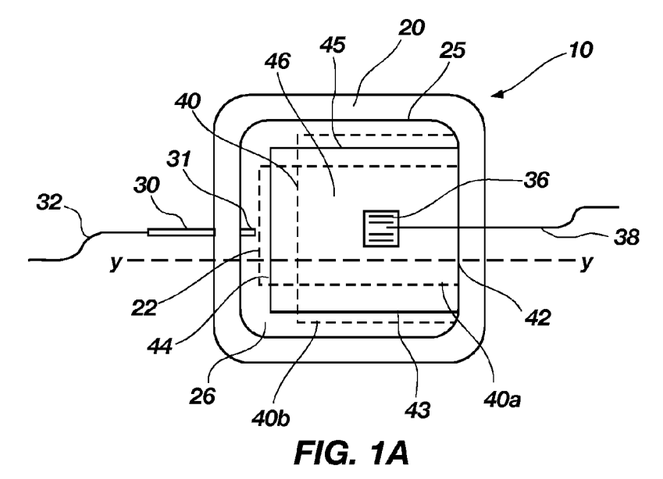
FIG. 1A depicts a first embodiment of a sensor of the present invention.
Figure 1B:
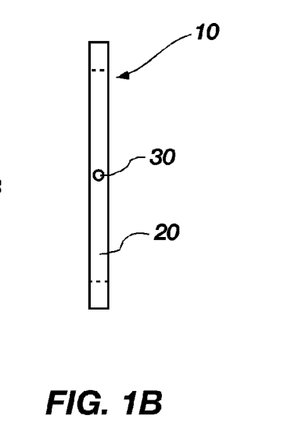
FIG. 1B depicts a side view of the sensor of FIG. 1A.

FIGS. 1A and 1B show a first embodiment of a relaxation modulus sensor 10 of the present invention. The relaxation modulus sensor 10 includes a frame 20 with a driver 40 disposed therein. The frame 20 may be, for example, square or rectangular, and include an opening 25 therethrough. The driver 40 may be sized to fit inside of the opening 25 of frame 20. For example, the driver 40 may be square or rectangular, having four sides. The driver 40 may be fixed to the frame 20 by a first side 42 thereof. There may be a separation 26 adjacent each of three sides 43, 44, 45 of the driver 40, between the frame 20 and the driver 40. In one embodiment, the separation 26 may be substantially U-shaped.

In use, the relaxation modulus sensor 10 may be embedded in a material to be tested, and the material may fill the opening 25 of the frame 20, particularly the separation 26 between the frame 20 and the driver 40. The test material disposed in the separation 26, specifically in a gap 22 between the frame 20 and a second side 44 of the driver 40 may be monitored, as described hereinbelow. The second side 44 of the driver may be opposite the first, fixed side 42 of the driver 40. During testing, the driver 40 may be stimulated to change shape, for example to elongate, and the dimensions of the gap 22 may change. The material disposed in the gap 22 may thus be subjected to a measurable stress.

The desired dimensions of the gap 22, and therefore the desired dimensions of the portion of the test material to be monitored, may be determined using finite element analysis. It may be desirable for the gap 22 to be narrow enough to generate a significant stress in the portion of test material in the gap 22 during testing, yet wide enough so that the portion of test material in the gap 22 is statistically representative of the surrounding test material. The desired dimensions of the gap 22 may vary, based on the material to be tested and the material of the driver 40. The material to be tested may be, for example, a viscoelastic material.

The driver 40 may be comprised of, for example, a smart material. A smart material is a material with a property that may be altered under a stimulus. A smart material which changes in volume or shape under a given stimulus may be used for the driver 40. Examples of suitable smart materials are piezoelectric materials, magnetostrictive materials, electrostrictive materials, and shape memory alloys. One suitable material for the driver 40 is TERFENOL-D®, available from Etrema Products of Ames, IA. TERFENOL-D® is a composite smart material, and is magnetostrictive, meaning it changes shape in a magnetic field. Other suitable smart materials include piezoceramics or a nickel alloy.

The driver 40 comprising a magnetostrictive material may be actuated using a magnetic field. An external magnet 50 (see FIG. 6) may displace orthogonally with respect to the magnetorestrictive material, and when the field lines of the magnet are aligned or perpendicular with the preferred axis of magnetostriction of the magnetostrictive material, the magnetostrictive material of the driver 40 will expand or contract, causing a stress in the test material in which the sensor 10 is embedded. With the external magnet 50 in a first position, the driver 40 has a first position, depicted in dashed lines as 40a in FIG. 1A, applying a compressive force on the test material disposed within the gap 22. The external magnet 50 may be turned about 90° from the first position to a second position, deforming the driver 40 to a second position. The driver 40 second position is depicted in dashed lines as 40b, applying a tensile force on the test material disposed within the gap 22. The driver 40 has a third, neutral position applying no force to the test material with no magnetic field present.

Alternatively, the driver 40 may comprise an electrostrictive material, for example an electrostrictive polymer or a shape memory alloy. An electrostrictive polymer or a shape memory alloy may be actuated using an electrical stimulation, which causes shape or size displacement of the material. Electrically conductive leads may be routed along the same path as the instrumentation leads, and provide the electrical stimulation for the driver 40. Under stimulation, the driver 40 may be deformed from a neutral position 40 to the first position 40a or to the second position 40b, as described hereinabove.

The sensor 10 may optionally be instrumented with a sensing device 36, which may be a strain gage such as a foil type or thin film strain gage, aligned with the axis of movement of the driver 40 and adhesively secured to a major surface 46 of the driver 40. The sensing device 36 may be used to measure the elongation or contraction of the driver 40. Optionally, the stimulus for the driver 40, for example the electrical output if the driver is electrically actuated, may be measured with a sensing device, and the measured stimulus may be used, in conjunction with the measured stress of the test material disposed within the gap 22, to determine the relaxation modulus.

A second sensing device 30, for example a pressure sensor such as a fiber optic pressure sensor, may be attached to the frame 20 with an active end 31 of the second sensing device 30 substantially centered in the gap 22. The second sensing device 30 may be used to measure the stress of the test material disposed within the gap 22. One suitable fiber optic pressure sensor is commercially available from FISO Technologies of Quebec City, Quebec, Canada. A fiber optic pressure sensor may be less than 0.04 inch in diameter, which may be useful for measuring the stress in a thin layer of test material. For example, the material properties of a propellant liner interface for a rocket motor, where the liner is conventionally only 0.05 to 0.08 inch thick, may be monitored with a sensor 10 of the present invention.

The sensor 10 may be embedded in the test material during the fabrication of the object to be tested. For example, it may be desirable to test the material of a liner of a rocket motor, as described in more detail hereinbelow. The liner, and therefore the test material, may comprise a viscoelastic material. In a liquid or other flowable state, the test material may be formed in the shape of the liner, and the sensor 10 may be embedded in the liquid material. The flowable test material may fill the separation 26 between the frame 20 and the driver 40. The flowable test material may surround the pressure sensor 30 within the gap 22. The flowable test material may be at least substantially solidified, for example by curing. A signal lead 38 for the sensing device 36 and a lead 32 for the second sensing device 30 may be configured to protrude from the test material 70 (see FIGS. 5A and 5B) and may be routed to a convenient location for associated instrumentation 34 (FIG. 6). The signal lead 38 and the lead 32 are depicted as a test lead bundle 48 in FIG. 6. The instrumentation 34 may include a power supply, a sensor measurement signal output device, a signal conditioner, a data logger, or a combination thereof.

In use, the driver 40 may be actuated by a stimulus (not shown) which may be one of an electrical charge, an electrical field or a magnetic field, depending on the material of the driver 40. When the driver 40 is subjected to the stimulus, the physical dimensions of the driver 40 may change primarily along a single axis y-y. For example the driver 40 may contract or elongate perpendicular to the fixed first side 42. The movement of the driver 40 may optionally be monitored using the output signal from the sensing device 36. The frame 20 may be formed of a rigid material, for example aluminum, and may remain in place, unaffected by the stimulus. The test material surrounding the driver 40 is proportionally displaced with each cycle of the driver 40, creating a stress which is greatest in the gap 22 between the driver 40 and the frame 20. The second sensing device 30 disposed centrally in the gap 22 is also displaced by the movement in the test material. This movement is sensed as a pressure change by the second sensing device 30, and a sensor measurement signal may be transmitted to the instrumentation 34 (see FIG. 6), for example to a sensor measurement signal output device. As the test material "relaxes" following the initial movement by the driver 40 the pressure measured by the second sensing device 30 will diminish over time. The strain measured using the sensing device 36 on the driver 40 and the pressure measured by second sensing device 30 over a predetermined time period may be used to determine the relaxation modulus of the test material.

The sensor 10 having the driver 40 comprising a magnetostrictive material is described hereinabove as having three positions, a first position 40a applying a compressive force, a second position 40b applying a tensile force, and a third, neutral position. The sensor 10 having these three driver positions may be embedded in the test material with the driver 40 in the neutral, non-actuated position. The sensor 10 may, alternatively, be embedded in the test material with the driver 40 in an actuated position 40a or 40b. For example, the sensor 10, having a driver 40 of a magnetostrictive material may be positioned in a liquid or other flowable sample of the test material. The driver 40 may be actuated to the first deformed position 40a with an adjacent magnet in a first position, and the flowable sample of the test material may be cured. After curing, the driver 40 may be actuated to a second deformed position 40b with the adjacent magnet in a second position, rotated about 90° from the first position. The magnitude of deformity of the driver 40 is thus greater, and a greater force is applied on the test material disposed in the gap 22 for the sensor 10 embedded in an actuated position 40a, 40b, in comparison to the sensor 10 embedded in the test material in a neutral position 40. The sensor 10 may thus be embedded with the driver 40 in the first position 40a, the second position 40b, the neutral position, or any intermediate position. While the driver positions of the sensor 10 have been described with respect to the driver 40 comprising a magnetostrictive material, any sensor of the present invention may be embedded with a driver in an actuated or deformed position.

Figure 2:
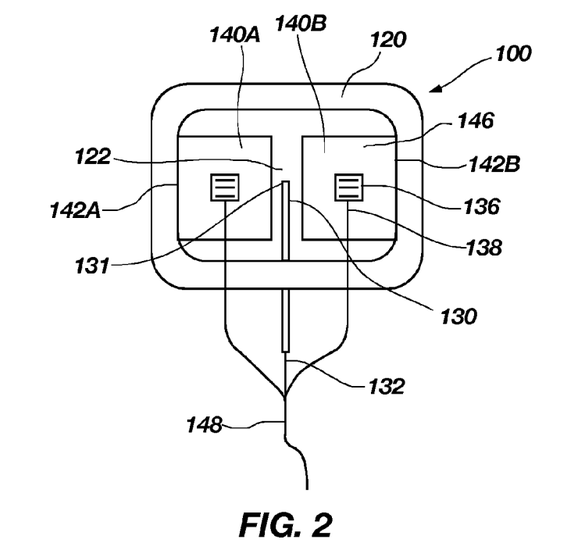
FIG. 2 depicts a second embodiment of a sensor of the present invention.

FIG. 2 depicts another embodiment of a relaxation modulus sensor 100 of the present invention. The relaxation modulus sensor 100 comprises two drivers 140A, 140B, each attached at one end 142A, 142B thereof to opposing inside edges of a square or rectangular frame 120. Each driver 140A, 140B may optionally include a sensing device 136, for example a strain gage, disposed on a major surface 146 thereof. A second sensing device 130, for example a pressure sensor, may be attached to the fame 120 with an active end 131 of the second sensing device 130 positioned in a gap 122 formed between the free ends of the drivers 140A, 140B. Signal leads 138 from the sensing devices 136 and a lead 132 from the second sensing device 130 may be accumulated into a lead bundle 148 and routed through the test material surrounding the sensor 100 to an accessible location for future testing. The drivers 140A, 140B may comprise a smart material, and may be actuated by an appropriate stimulus, causing the length of the drivers 140A, 140B to change along an axis, perpendicular to the fixed end 142A. The length change of drivers 140A, 140B will either compress or stretch the test material disposed in gap 122, causing a stress therein which may be measured with the second sensing device 130.

Figure 3:
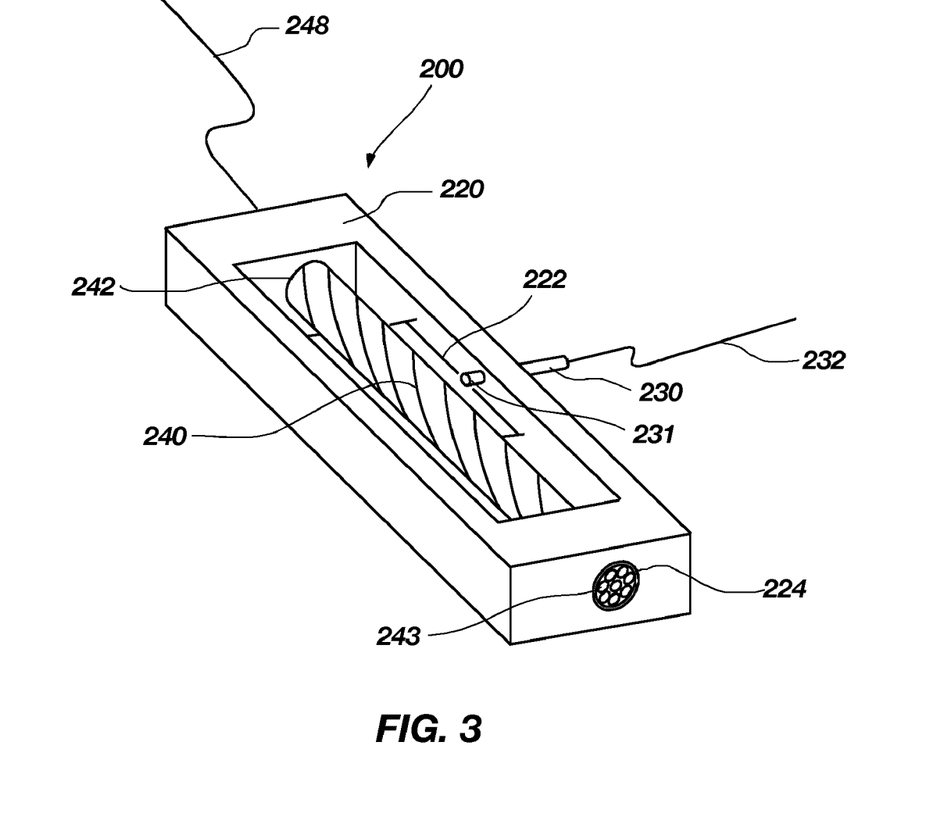
FIG. 3 illustrates a third embodiment of a sensor of the present invention.

FIG. 3 illustrates a third embodiment of a sensor 200, including a shape metal alloy driver 240 disposed within a frame 220. The shape metal alloy driver 240 may comprise a plurality of shape metal alloy wires or smart wire strands twisted together in an elongated body. A shape metal is a metal which may be stimulated directly with heat or heat generated by electrical resistance to cause deformation, and remembers and returns to its original geometry after the deforming. A shape memory alloy wire reacts when resistance to an electric current in the wire generates heat. The shape metal alloy driver 240 is installed in the opening of a rectangular rigid frame 220 with a first end 242 fixedly attached to the frame 220 and a second end 243 extending through an opening 224 through the frame 220. The opening 224 may be formed, for example, by drilling. The second end 243 is loosely constrained in the opening 224 and is free to rotate when stimulated. A sensing device 230, for example a pressure sensor, is attached to the frame, with an active end 231 of the sensing device 230 disposed in a gap 222 between a side of the shape metal alloy driver 240 and the frame 220. A power supply (not shown) may be in communication with lead 248 and may be used to stimulate the driver 240.

In use, the sensor 200 may be embedded in a test material. When stimulated, for example using heat or electricity, the individual shape metal alloy wire strands of the driver 240 will begin to straighten and untwist, creating a torsional moment at the free second end 243 of driver 240. The torsional moment is transmitted to the test material surrounding the sensor 200 with the greatest stress generated as a shear force in the test material disposed in the gap 222 between the side of the driver 240 and the inside edge of the frame 220. The stress in the test material may be measured by the sensing device 230 and carried to instrumentation by lead 232. The stress may be measured over a predetermined time to determine the relaxation modulus of the test material. Individual shape metal alloy wire strands of the driver 240 may alternatively twist more tightly together when stimulated, creating a stress in the test material.

Figure 4A:
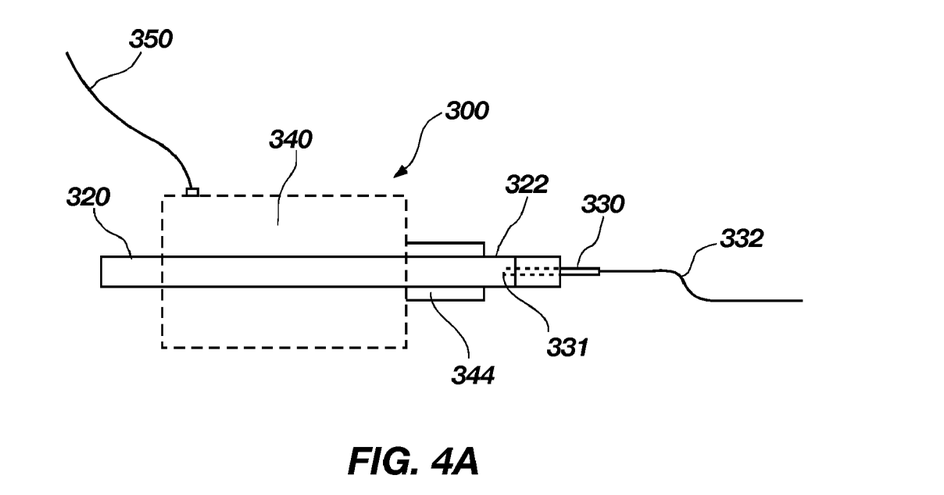
FIG. 4A shows a fourth embodiment of a sensor of the present invention.
Figure 4B:
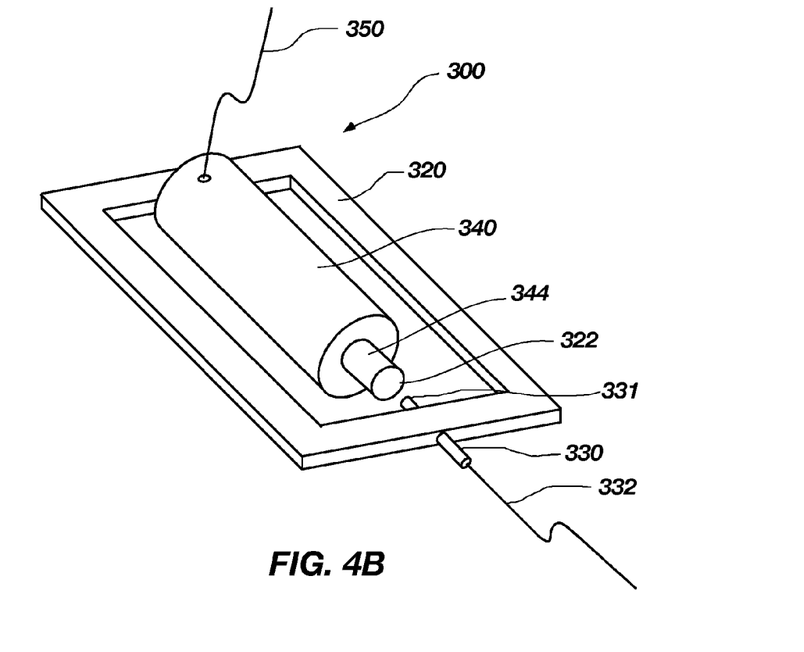
FIG. 4B depicts an isometric view of the sensor of FIG. 4A.

A fourth embodiment of a sensor 300 of the present invention, depicted in FIGS. 4A and 4B, may include a driver 340 having a movable element 344. The driver 340 may comprise, for example, an electric motor, a hydraulic cylinder, a solenoid, a cam-slider mechanism, a screw actuated ram, or a servo motor with a rod, disk or swing-arm. The movable element 344 may comprise, for example, a core cylinder of a hydraulic cylinder. The driver 340 may be disposed within a frame 320, with a gap 322 between the movable element 344 and the frame 320. The movable element 344 may rotate or move linearly with respect to the frame 320. In use, the sensor 300 may be embedded in a test material (not shown). The movable element 344 of the driver 340 may be actuated with an electrical current through a conductive line 350, causing a stress in the test material disposed within the gap 322. A pressure sensor 330 is attached to the frame with an active end 331 of pressure sensor 330 disposed in the gap 322. The power and signal for the pressure sensor 330 may be carried by a lead 332. The pressure sensor 330 may be used to measure the stress in the test material disposed within the gap. The measured stress may be used to determine the relaxation modulus of the test material.

Figure 5A:
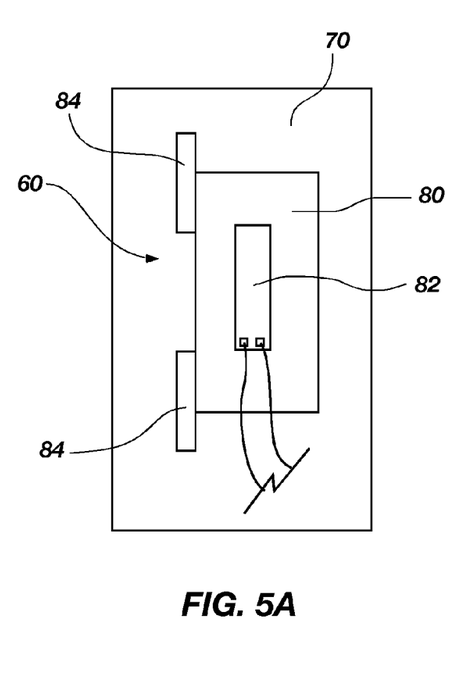
FIG. 5A depicts a fifth embodiment of a sensor of the present invention.
Figure 5B:
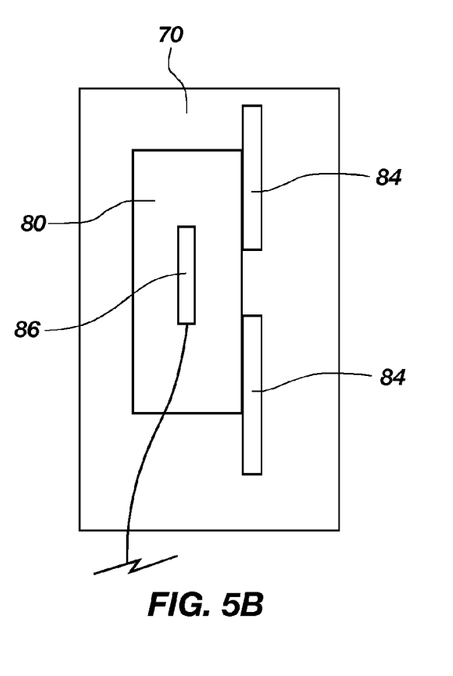
FIG. 5B depicts an opposite side view of the sensor of FIG. 5A.
Figure 6:
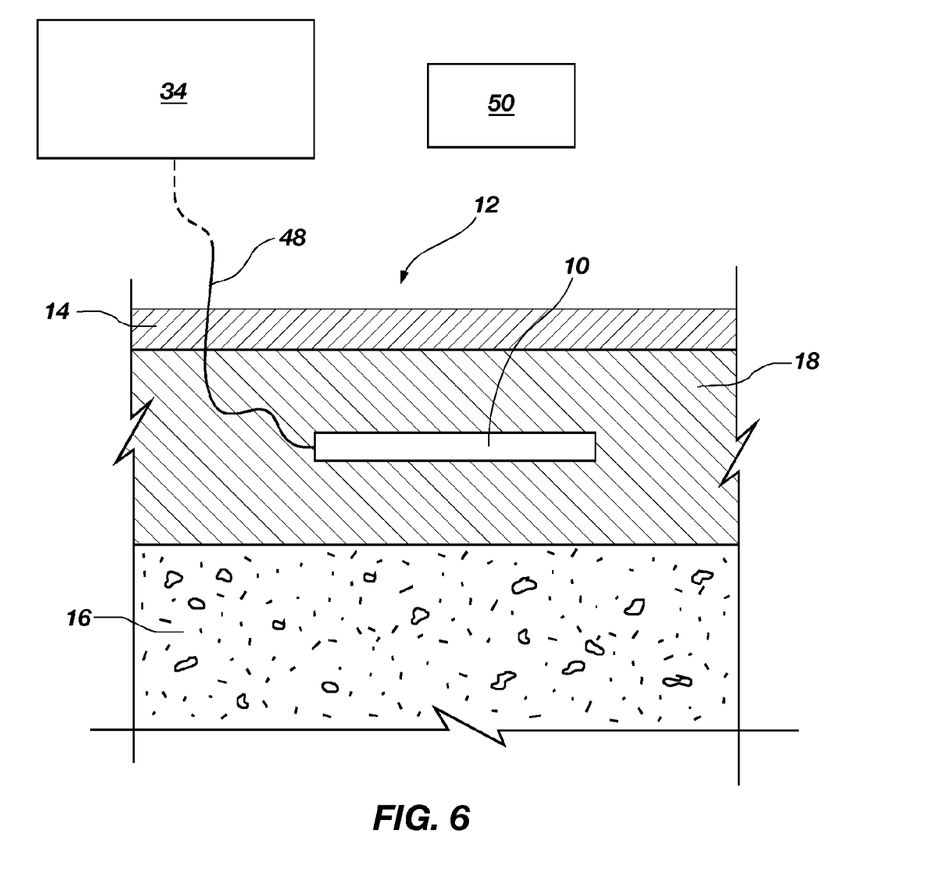
FIG. 6 illustrates a sensor of the present invention embedded in a material.

FIG. 5A illustrates a fifth embodiment of a sensor 60 of the present invention embedded in a test material 70. The sensor 60 comprises a driver 80 comprising a deformable smart material, such as the materials described hereinabove. A first sensor 82 is affixed to a surface of the driver 80, and may comprise a foil strain gage configured to measure the deformation of the driver 80. At least one pressure sensor 84, for example a fiber optic pressure sensor, may be embedded in the test material 70, at least partially adjacent to the driver 80. A second sensor 86, for example a fiber optic strain gage may be affixed to a second, opposing surface of the driver 80, as shown in FIG. 5B. In use, the driver may be actuated, for example using a magnetic field, to deform the driver 80. The first sensor 82 may be used to measure the motion of the driver 80, and the second sensor 86 may be used to measure the strain of the driver 80. The pressure sensor 84 may be used to measure the stress of the test material 70.

FIG. 6 illustrates a sensor 10, 60, 100, 200, 300 installed in a solid fuel rocket motor 12. The sensor 10 (or other sensor according to an embodiment of the invention) may be embedded in the viscoelastic liner 18 during the assembly process before the liner 18 is cured. Once the rocket motor 12 is assembled, the liner 18 is disposed between the casing 14, which may be a metal, such as steel, aluminum, or titanium or a fiber composite such as graphite or KEVLAR® and the cast propellant core 16. The liner 18 prevents the gases generated by the propellant core 16 from reaching and burning through the motor casing 14. A liner 18 failure is usually catastrophic, with potential for loss of life and property. Conventionally, in order to test the liner condition of a motor, the motor must be completely dissected and destroyed. The data gathered from dissected motor is extrapolated to similar motors in the fleet. The sensor 10 of the present invention may be installed in the rocket motor 12, and attached to the appropriate test equipment or instrumentation 34, such as a data logger, signal conditioner and power supply using the test lead bundle 48. Material properties of the liner 18 of the rocket motor 12 may be measured with the liner 18 in situ in the rocket motor 12. This in situ, nondestructive testing provides reliable information about the liner condition in the individual rocket motors 12 and preserves the rocket motor 12 for further use. It is anticipated that the sensor 10 or other sensor according to the invention can be installed in situ in a myriad of applications where information regarding the condition of viscoelastic materials, such as liners, is desirable. Such applications include, but are not limited to, ship propulsion systems, jet propulsion systems or power generation equipment.

Figure 7:
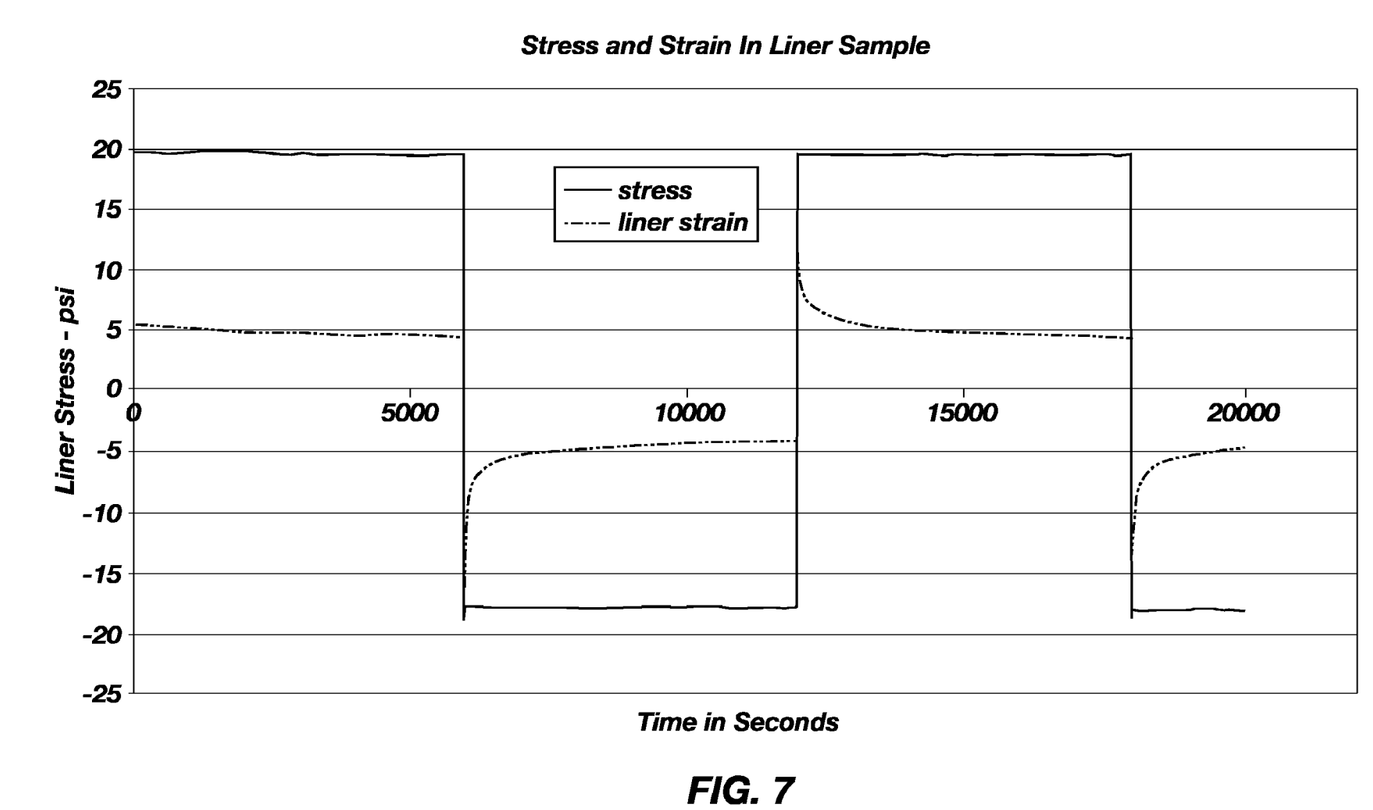
FIG. 7 is a graph of stress and strain in a viscoelastic material, which may be measured using a sensor of the present invention.

FIG. 7 is a graph showing data from a relaxation modulus test using the sensor 10 with the driver 40 comprising a TERFENOL-D® magnetostrictive material embedded in a circular sample of solid-fuel rocket motor liner 4 inches in diameter and 1 inch thick.

Figure 8:
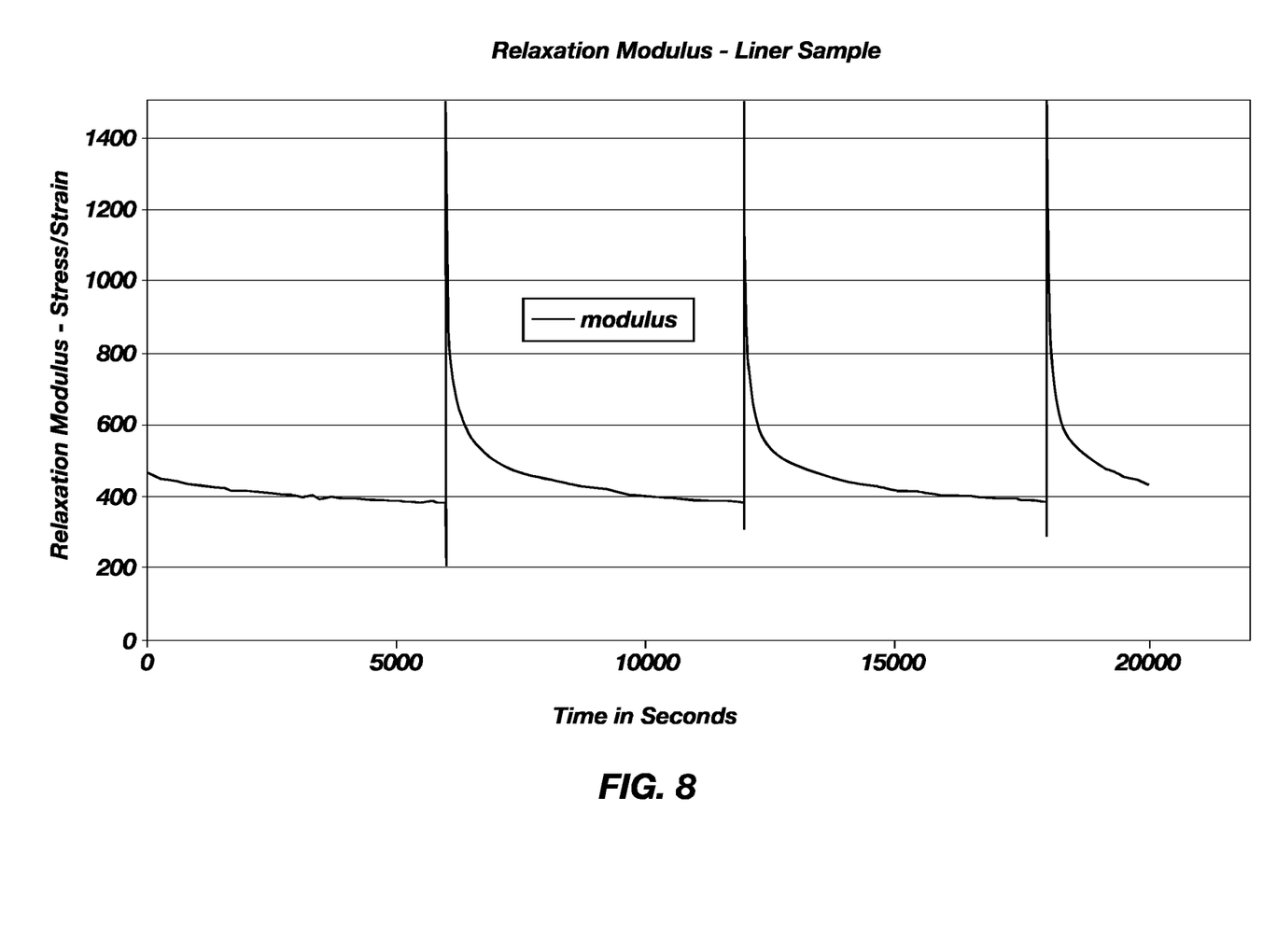
FIG. 8 is a graph of a relaxation modulus response curve of the viscoelastic material, the stress and strain of which are depicted in the graph FIG. 7.

The sensor 10 was substantially centered in the sample and subjected to a magnetic field generated by a rare earth magnet mounted on a servo motor, which automated rotation of the magnet between 0° and 90°. With the magnet in a first position, the magnetic field was lined up with the preferred axis of magnetostriction of the TERFENOL-D®, in a second position the magnetic field is at a right angle to the preferred axis. The face of the magnet was positioned approximately 0.6 inch from the sensor 10. The magnetic field caused the TERFENOL-D® driver to undergo strains of roughly 650 and −700 microstrain at the 0° and 90° positions. With this strain the second side 44 of the driver 40 elongated 0.0325 inch and contracted 0.035 inch from its initial position, which in turn induced strains on the liner in the gap 22 between the driver 40 and the frame 20 of about −1.1% compressive and 1.2% tensile. Stress levels at the second sensing device 30 initially read 18 psi in compression and −18.5 psi in tension and then decayed following a standard stress relaxation curve for the type of material tested. Dividing the stress by the associated strain generates the relaxation modulus curve shown in FIG. 8. The stress in the liner is represented by the curved lines and the strain of the driver 40 is represented by the straight lines in FIG. 7.

Embodiments of sensors 10, 60, 100, 200, 300 of the present invention are useful for nondestructively monitoring relaxation modulus of a rubber-like viscoelastic material in situ and can be used for post-cure condition monitoring to allow detection of composition or curing cycle errors, which improves overall manufacturing quality control. The sensor may also be used as part of a long-term condition monitoring program. The long-term program may include monitoring the effects of aging in a sensitive application such as viscoelastic liners in a solid-fuel rocket motor where a liner failure could be catastrophic.

An embodiment of a sensor 10, 60, 100, 200, 300 may, for example, be embedded in liner bondline between the propellant and the insulation of a rocket motor to monitor the propellant liner interface (PLI) bondline properties of the rocket motor. The liner is conventionally 0.05 to 0.08 inch thick; therefore the sensor 10, 60, 100, 200, 300 of the present invention, having a thin profile, maybe useful.

Another embodiment of a testing method using an embodiment of a sensor 10, 60, 100, 200, 300 is an aging test. The sensor 10, 60, 100, 200, 300 may be embedded in a sample of test material. The sensor may be embedded with the driver 40, 80, 140, 240, 340 in a deformed position. The sample may be positioned in an oven for thermal cycling to simulate the aging process. The entire sample may be loaded using conventional methods to produce stress representative of use and storage conditions for an application of the test material. The driver 40, 80, 140, 240, 340 of the sensor 10, 60, 100, 200, 300 may be actuated, and data may be collected over a predetermined period of time to obtain a relaxation modulus curve for the test material.

While the invention may be susceptible to various modifications and alternative forms, specific embodiments have been shown by way of example in the drawings and have been described in detail herein. However, it should be understood that the invention is not intended to be limited to the particular forms disclosed. For example, a sensor 10, 60, 100, 200, 300 may be embedded in the propellant core 16 of a rocket motor 12 (FIG. 6) in addition to, or as an alternative to a sensor 10, 60, 100, 200, 300 embedded in the liner 18. The properties of the propellant core 16 may change with age. If they change too much, the propellant core 16 could crack or become separated from the liner 18, either of which could lead to catastrophic failure of the motor. Bye monitoring relaxation modulus in the propellant core 16, aging trends of the propellant core 16 may be determined, and failures may be predicted and prevented. Rather, the invention is to cover all modifications, equivalents, and alternatives falling within the spirit and scope of the invention as defined by the following appended claims.

What is claimed is:

1. A sensor for measuring relaxation modulus in a test material, comprising:
   a frame having an opening therethrough embedded in the test material;
   a driver mounted within the opening of the frame embedded in the test material, the driver comprising one of an electric motor, an electric solenoid, a hydraulic solenoid, a hydraulic cylinder, and a gas operated cylinder;
   a first sensing device in communication with the driver; and
   a second sensing device disposed within a gap between the driver and the frame embedded in the test material.

2. The sensor of claim 1, wherein an edge of the driver is attached to an inside edge of the frame.

3. The sensor of claim 1, wherein the first sensing device is configured to measure a stimulus of the driver.

4. The sensor of claim 1, wherein the first sensing device comprises a strain gage.

5. The sensor of claim 4, wherein the strain gage comprises a foil type gage or a thin film strain gage.

6. A sensor for measuring relaxation modulus in a test material, comprising:
   a frame having an opening therethrough;
   a driver mounted within the opening of the frame, wherein the driver comprises a smart material;
   a first sensing device in communication with the driver; and
   a second sensing device disposed within a gap between the driver and the frame.

7. The sensor of claim 6, wherein the smart material is one of a shape memory alloy, an electrostrictive material and a magnetostrictive material.

8. The sensor of claim 6, further comprising a second driver mounted within the opening of the frame.

9. The sensor of claim 8, wherein the second sensing device is disposed between the driver and the second driver.

10. A sensor for measuring relaxation modulus in a test material, comprising:
    a frame having an opening therethrough;
    a driver mounted within the opening of the frame, the driver comprising a plurality of twisted shape metal alloy wires;
    a first sensing device in communication with the driver; and
    a second sensing device disposed within a gap between the driver and the frame.

11. A sensor for measuring relaxation modulus in a test material, comprising:
    a frame having an opening therethrough;
    a driver mounted within the opening of the frame, the driver comprising one of an electric motor, an electric solenoid, a hydraulic solenoid, a hydraulic cylinder, and a gas operated cylinder;
    a first sensing device in communication with the driver; and
    a second sensing device disposed within a gap between the driver and the frame, the second sensing device comprising a pressure sensor.

12. The sensor of claim 11, wherein the pressure sensor comprises a fiber optic pressure sensor.

13. A method for measuring relaxation modulus in a test material comprising:
    providing a sensor comprising at least one driver including a movable element;
    embedding the sensor in the test material;
    actuating the at least one driver including the movable element with as a stimulus to create a stress in the test material, wherein creating the stress in the material comprises applying a force in one of tension, compression, torsion, and a combination thereof to the test material; and
    sensing the stress in the test material.

14. The method of claim 13, wherein the stimulus comprises electricity or hydraulic pressure.

15. The method of claim 13, wherein sensing the stress in the test material comprises sensing the stress over a predetermined period of time.

16. The method of claim 13, wherein sensing the stress in the test material comprises measuring the pressure in the test material with a pressure sensor.

17. A method for measuring relaxation modulus in a test material comprising:
    providing a sensor comprising at least one deformable driver;
    embedding the sensor in the test material;
    actuating the at least one deformable driver with a stimulus to create a stress in the test material,
    wherein creating the stress in the test material comprises applying a force in one of tension, compression and torsion to the test material; and
    sensing the stress in the test material.

18. The method of claim 17, further comprising sensing a deformation of the at least one deformable driver with a strain gage thereon.

19. The method of claim 17, wherein providing the sensor comprising the at least one deformable driver comprises forming a deformable driver of a smart material.

20. The method of claim 17, wherein providing the sensor comprises providing a frame having an opening therethrough, and disposing the at least one deformable driver within the opening.

21. The method of claim 17, wherein embedding the sensor in the test material comprises embedding the sensor with the at least one deformable driver in a first deformed position, and actuating the at least one deformable driver comprises deforming the at least one deformable driver to a second, different deformed position.

22. The method of claim 17, wherein providing the sensor comprising the least one deformable driver comprises providing the sensor comprising two deformable drivers.

23. The method of claim 22, wherein actuating the at least one deformable driver comprises actuating the two deformable drivers.

24. A sensor for measuring relaxation modulus in a test material, comprising:
    a frame having an opening therethrough;
    a driver located in the frame comprising a movable element embedded in the test material for deforming the test material, the driver comprising one of an electric motor, an electric solenoid, a hydraulic solenoid, a hydraulic cylinder, a gas operated cylinder, and a plurality of twisted shape metal alloy wires;
    a first sensing device in communication with the test material embedded in the test material; and
    a second sensing device embedded in the test material.

25. The sensor of claim 24, wherein the first sensing device comprises a strain gage.

26. The sensor of claim 24, wherein the second sensing device comprises a pressure sensor.

27. A rocket motor, comprising:
    a propellant;
    a liner at least partially surrounding the propellant; and
    a sensor substantially embedded in the liner, the sensor comprising:

a frame having an opening therethrough;
a driver mounted within the opening of the frame;
a first sensing device in communication with the driver; and
a second sensing device disposed within a gap formed between the driver and the frame.

* * * * *

UNITED STATES PATENT AND TRADEMARK OFFICE
CERTIFICATE OF CORRECTION

| | | |
|---|---|---|
| PATENT NO. | : 7,581,450 B2 | |
| APPLICATION NO. | : 11/555029 | |
| DATED | : September 1, 2009 | |
| INVENTOR(S) | : Mont A. Johnson et al. | |

It is certified that error appears in the above-identified patent and that said Letters Patent is hereby corrected as shown below:

In the specification:
    COLUMN 8,    LINE 33,        change "maybe" to --may be--

Signed and Sealed this
Twentieth Day of September, 2011

David J. Kappos
*Director of the United States Patent and Trademark Office*